(12) United States Patent
Liu

(10) Patent No.: US 10,891,755 B2
(45) Date of Patent: Jan. 12, 2021

(54) APPARATUS, SYSTEM, AND METHOD FOR CONTROLLING AN IMAGING DEVICE

(71) Applicant: Danxiao Information Technology Ltd., Guangdong (CN)

(72) Inventor: Dan Liu, Guangzhou (CN)

(73) Assignee: Danxiao Information Technology Ltd., Guangdong (CN)

( * ) Notice: Subject to any disclaimer, the term of this patent is extended or adjusted under 35 U.S.C. 154(b) by 187 days.

(21) Appl. No.: 16/369,012

(22) Filed: Mar. 29, 2019

(65) Prior Publication Data

US 2020/0311968 A1  Oct. 1, 2020

(51) Int. Cl.
*A61H 9/00* (2006.01)
*G06T 7/73* (2017.01)

(52) U.S. Cl.
CPC ...... *G06T 7/73* (2017.01); *G06T 2207/30196* (2013.01)

(58) Field of Classification Search
CPC ............. B64C 39/024; B64C 2201/00; G05D 1/0033; G05D 1/0038; G05D 1/0044; G05D 1/0231; G05D 1/0214; G05D 1/0212; A61B 2034/2065; B60T 2210/00; B60T 2210/30; B60T 2210/32; G08B 13/19608; G08B 13/19606; G08G 1/0968; B60R 21/00; G01C 21/3626; G06K 2209/21; G06K 9/00671; G06K 9/00778; G06K 9/00771; G06K 9/00993; G06K 9/03; G06F 16/907; G06F 16/583; G06F 16/58; G06F 16/9537; G06F 16/29; G06T 7/73; G06T 7/74; G06T 7/75; G06Q 30/0281
See application file for complete search history.

(56) References Cited

U.S. PATENT DOCUMENTS

| 6,368,268 | B1 * | 4/2002 | Sandvick | A61H 19/44 600/38 |
| 9,762,515 | B1 * | 9/2017 | Olivares | H04L 12/1822 |
| 2015/0366748 | A1 * | 12/2015 | Cambridge | A61H 19/44 600/38 |

\* cited by examiner

*Primary Examiner* — Duy M Dang
(74) *Attorney, Agent, or Firm* — Ellenoff Grossman & Schole LLP; James M. Smedley; Alex Korona

(57) ABSTRACT

A method is disclosed. The method includes imaging a target object in a first imaging mode using an imaging device, identifying a feature of the target object, using image recognition to recognize the feature, and determining a spatial coordinate data of the feature. The method further includes updating the spatial coordinate data of the feature after the target object moves, transferring a feature input data, the feature input data requesting additional imaging of the feature, and actuating the imaging device based on the spatial coordinate data to additionally image the feature in a second imaging mode using the imaging device.

20 Claims, 8 Drawing Sheets

APPARATUS, SYSTEM, AND METHOD FOR CONTROLLING AN IMAGING DEVICE

FIELD OF THE INVENTION

The present disclosure generally relates to an apparatus, system, and method for controlling a device, and more particularly to an apparatus, system, and method for controlling an imaging device.

BACKGROUND OF THE INVENTION

Conventional imaging device control methods are typically controlled by a single user. For example, conventional control of imaging devices for providing images of a model such as a human model to a viewer typically involve direct control of the imaging device by the model. Accordingly, control of the imaging device is typically at the discretion of the model, which may result in significant uncertainty for a user paying to view real-time video or pictures. Also, miscommunication between the user and the model may result in images other than those desired by the user being transferred.

Accordingly, a need in the art exists for an efficient technique for displaying pictures and videos of a model at a desired resolution and scope to a user. Also, a need in the art exists for efficiently allowing a user to specify features of a model to be displayed.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method. The method includes imaging a target object in a first imaging mode using an imaging device, identifying a feature of the target object, using image recognition to recognize the feature, and determining a spatial coordinate data of the feature. The method further includes updating the spatial coordinate data of the feature after the target object moves, transferring a feature input data, the feature input data requesting additional imaging of the feature, and actuating the imaging device based on the spatial coordinate data to additionally image the feature in a second imaging mode using the imaging device.

In another aspect, the present disclosure is directed to a system. The system includes an image recognition module, comprising computer-executable code stored in non-volatile memory, a location module, comprising computer-executable code stored in non-volatile memory, a buffer storage, a processor, and an imaging device. The image recognition module, the location module, the buffer storage, the processor, and the imaging device are configured to image a target object in a first imaging mode using an imaging device, identify a plurality of features of the target object, and recognize the plurality of features using the image recognition module. The image recognition module, the location module, the buffer storage, the processor, and the imaging device are configured to determine a spatial coordinate data for each of the plurality of features using the location module, update the spatial coordinate data of the plurality of features after the target object moves, transfer a feature input data, the feature input data requesting additional imaging of one of the plurality of features, and actuate the imaging device based on the spatial coordinate data of the one of the plurality of features to additionally image the one of the plurality of features in a second imaging mode using the imaging device. The spatial coordinate data of the plurality of features is stored in the buffer storage.

DETAILED DESCRIPTION AND INDUSTRIAL APPLICABILITY

Figure 1:
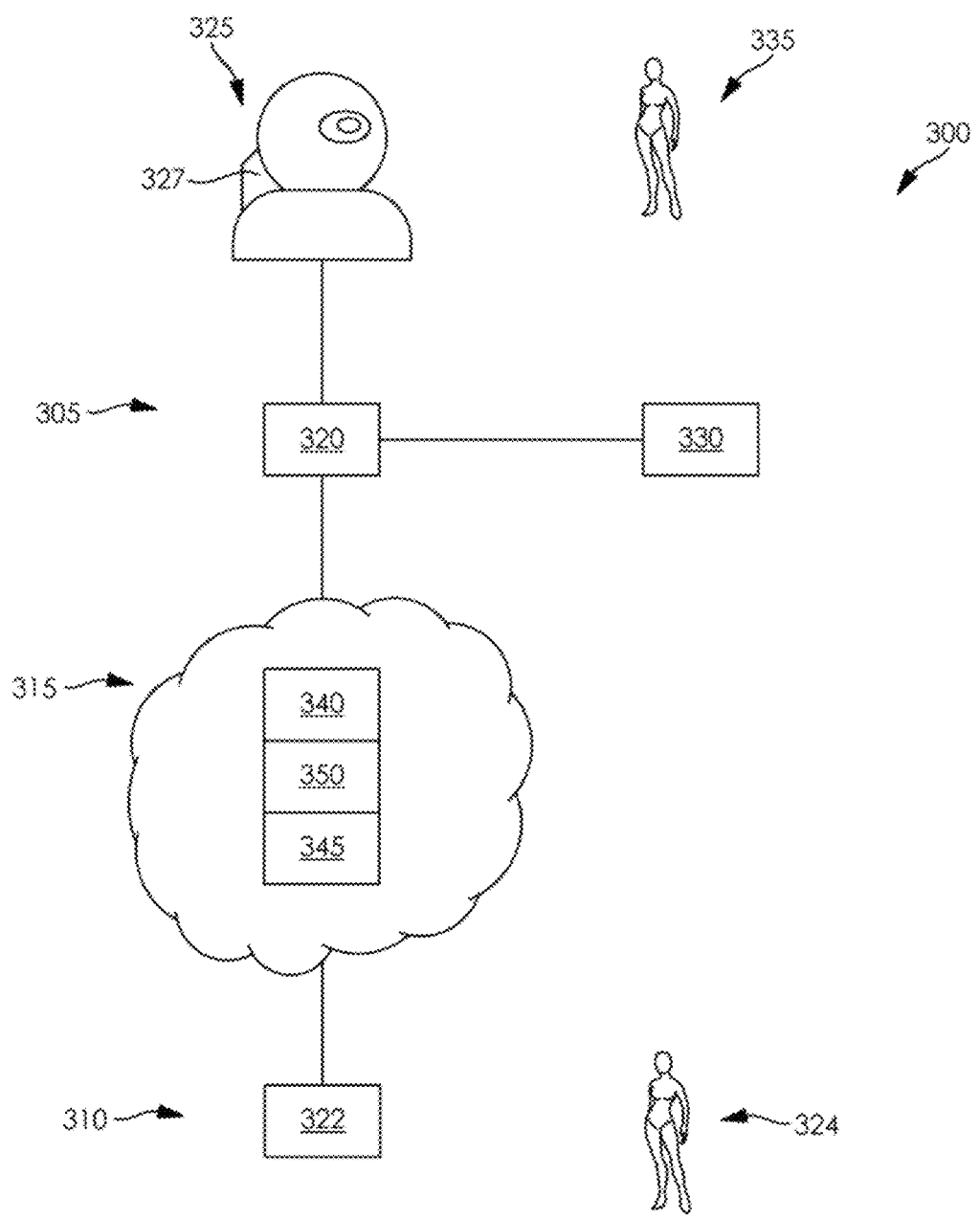
FIG. 1 is a schematic illustration of an exemplary system of the present invention.

FIG. 1 illustrates an exemplary system 300 for visual control. System 300 may be used in any suitable application for controlling an imaging device to provide a visual display. For example, system 300 may be used in any suitable application for controlling a camera or other imaging device to provide a visual display of any desired subject such as a human subject, an animal, an inanimate subject, and/or any desired location such as a residential, commercial, industrial, or transportation infrastructure location (e.g., airport or bridge). In at least some exemplary embodiments, system 300 may be a system for controlling an imaging device such as a camera to display images of a human model based on input provided by a user.

As illustrated in FIG. 1, system 300 may include a model subsystem 305, a user subsystem 310, and a server subsystem 315. Server subsystem 315 may receive, transmit, and/or exchange data such as user input and image data with model subsystem 305 and user subsystem 310.

As illustrated in FIG. 1, model subsystem 305 may include a model device 320, an imaging device 325, and an accessory 330 that may be operated and/or utilized by a user (e.g., a model 335). Model device 320 may receive, transmit, and/or exchange data such as user input and image data with imaging device 325 and accessory 330.

Model device 320 may be any suitable device for interfacing with other components of system 300 such as a computing device (e.g., user interface). For example, model device 320 may be any suitable user interface for receiving input and/or providing output (e.g., image data) to model 335 and/or server subsystem 315. Model device 320 may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 9 and 10). For example, model device 320 may include a touchscreen device of a smartphone or handheld tablet. For example, model device 320 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data.

Imaging device 325 may be any suitable imaging device such as a camera. For example, imaging device 325 may be any suitable video camera such as a digital video camera, a webcam, and/or any other suitable camera for recording visual data (e.g., recording a video or taking pictures). Imaging device 325 may be for example a three-dimensional video sensor or camera. One or more imaging devices 325 may include a plurality of cameras or a single camera configured to collect three-dimensional image data. In at least some exemplary embodiments, imaging device 325 may be a stereoscopic camera and/or any other suitable device for stereo photography, stereo videography, and/or stereoscopic vision. Imaging device 325 may be substantially entirely integrated into model device 320 or may be a stand-alone device. In at least some exemplary embodiments, imaging device 325 may be a smartphone or tablet camera (e.g., that may be integrated into model device 320). Imaging device 325 may provide data to an exemplary image recognition module of server subsystem 315 (e.g., as described for example below) via model device 320. An operation of imaging device 325 may be controlled by system 300 as described for example below. One or more components of the exemplary image recognition module of server subsystem 315 described below may for example be integrated into imaging device 325. Imaging device 325 may perform some or substantially all image recognition processing steps as described for example below.

Imaging device 325 may include one or more actuators 327 that may adjust a position of imaging device 325 based on an operation of system 300. Actuators 327 may be for example one or more external actuators disposed at an exterior of imaging device 325 and/or one or more integrated actuators that are completely or partially integrated into imaging device 325 (e.g., disposed and/or integrated within an interior of imaging device 325). In at least some exemplary embodiments, actuator 327 may be internally integrated into imaging device 325 and may turn optical components and/or move lenses of imaging device 325 within a housing of imaging device 325 to zoom in and out at different features or points within a variable field of view of imaging device 325 (e.g., zoom in and out on points or features of model 335 and/or accessory 330). Actuator 327 may also be one or more external and/or internally-integrated mechanical actuators configured to mechanically turn imaging device 325 and move lenses of imaging device 325 to focus in and out at desired objects (e.g., points and/or features of model 325 and/or accessory 330). For example actuator 327 may be a mechanical actuator that is electrically powered, battery-powered, and/or powered via any other suitable power source. Actuator 327 may also be for example a hydraulic actuator, pneumatic actuator, magnetic actuator, and/or any other suitable actuator configured to turn and focus imaging device 325 (e.g., based on a size of imaging device 325).

Accessory 330 may be any suitable accessory for use by model 335 (e.g., when model 335 is imaged by imaging device 325). For example, accessory 330 may be a prop that is used by model 335 while model 335 is being imaged (e.g., a video or pictures of model 335 is being recorded and/or transmitted in real-time to be viewed by a user of user subsystem 310 as described below). For example, accessory 330 may be a device used for erotic stimulation (e.g., a sex aid or a "sex toy"). In at least some exemplary embodiments, accessory 330 may be a massaging apparatus for human genitalia (e.g., a vibrator). For example, accessory 330 may be any suitable device for use in a video or pictures recorded by imaging device 325, which may be an erotic video or erotic pictures). In at least some exemplary embodiments, accessory 330 may be a tool or other indicator that may be used in video or pictures recorded by imaging device 325 such as surveying equipment, a sign providing information such as location or time information, a surveillance tool used by model 335, or any other suitable tool or accessory that may be used while imaging device 325 is recording a video or pictures of model 335. For example, model 335 may be an erotic model using accessory 330 that may be an erotic device, a technician or laborer using accessory 330 that may be a tool or work device specific to a desired application, an agent using accessory 330 that may be a surveillance tool or a part of a weapon system being recorded by imaging device 325, and/or any other desired role using any suitable accessory 330.

Accessory 330 may be in communication with model device 320. For example, accessory 330 may be in wireless communication (e.g., or via cord or other connection) to exchange data with model device 320 based on an operation of system 300. Accessory 330 may also be in communication with any other suitable component of system 300 such as components of server subsystem 315 and/or user subsystem 310. System 300 may thereby transmit data to and/or receive data from accessory 330 to control an operation of accessory 330.

As illustrated in FIG. 1, user subsystem 310 may include a user device 322 that may be a similar device as model device 320. User device 322 may provide a user 324 with output such as image data and other desired output and/or input prompts for providing input to system 300. User device 322 may transmit, receive, and exchange data with server subsystem 315. It is also contemplated that user device 322 may communicate directly with any other suitable component of system 300 such as model device 320, imaging device 325, and/or accessory 330.

As illustrated in FIG. 1, server subsystem 315 may include components similar to the exemplary computing device and network components described below regarding FIGS. 9 and 10. For example, server subsystem 315 may include one or more modules having computer-executable code stored in non-volatile memory. Server subsystem 315 may also include a processor for processing data associated with system 300 as disclosed herein that may be partially or substantially entirely integrated into any component (e.g., or combination of components) of system 300. Server subsystem 315 may for example include an image recognition module 340, a location module 345 (e.g., a location arithmetic module as described below), and a buffer storage 350. Image recognition module 340, location module 345, and buffer storage 350 may operate in conjunction with the other components of server subsystem 315, model subsystem 305, and user subsystem 310 as described for example herein.

System 300 may transmit image data recorded by imaging device 325 to image recognition module 340, which may be real-time or near real-time data relative to the time of processing performed by image recognition module 340. It is also contemplated that the data may be previously-recorded data by imaging device 325. Imaging device 325, model device 320, and/or image recognition module 340 may include components for finding points and/or features on an object within the field of view of imaging device 325. For example, imaging device 325, model device 320, and/or image recognition module 340 may include optical tracking components that may perform feature detection and matching to allow for matching and comparison of features imaged by imaging device 325. For example, imaging device 325, model device 320, and/or image recognition module 340 may include components configured to allow imaging device 325 to find predetermined features that may correspond to two-dimensional and/or three-dimensional surfaces and/or contours of an object within a field of view of imaging device 325. For example, imaging device 325, model device 320, and/or image recognition module 340 may include components configured to use any suitable technique to identify features (e.g., spatial data) of a viewed object (e.g., features of model 335 and/or accessory 330) and to match those imaged features to predetermined features provided by system 300 (e.g., or provided by a user such as model 335). For example, imaging device 325, model device 320, and/or image recognition module 340 may identify predetermined features of model 335 such as body features. Also for example, imaging device 325, model device 320, and/or image recognition module 340 may include components configured to perform optical character recognition of text and/or markings located on a viewed object (e.g., on model 335 and/or accessory 330). For example, imaging device 325, model device 320, and/or image recognition module 340 may include any suitable components configured to determine spatial and/or other data that may be matched to predetermined data provided by system 300 (e.g., predetermined shapes, colors, text, contours, and other features). For example, the spatial data and/or other data may include data defining points (e.g., or contours) of model 335 and/or accessory 330 based on an actual image of an object imaged by imaging device 325. For example, imaging device 325, model device 320, and/or image recognition module 340 may provide spatial and/or other suitable data to system 300 that may be matched to predetermined data (e.g., or data previously provided by a user such as model 335) describing objects (e.g., model 335 and/or accessory 330) expected to be viewed by imaging device 325. For example, imaging device 325, model device 320, and/or image recognition module 340 may determine spatial and/or image data based on viewing an object and provide such data to system 300, which may match that data to predetermined data to identify points or features of the object being viewed (e.g., points or features of one or more models 335, one or more accessories 330, and/or any other desired objects). For example, imaging device 325, model device 320, and/or image recognition module 340 may be configured to perform any suitable techniques for recognizing objects and/or determining spatial and/or other data of a viewed object for use with other components of system 300. Also for example, imaging device 325, model device 320, and/or image recognition module 340 may recognize text (e.g., by using optical character recognition) or other markings on an exemplary object viewed (e.g., and recorded as image data) by imaging device 325.

Location module 345 may include components similar to the exemplary computing device and network components described below regarding FIGS. 9 and 10. Location module 345 may be for example a location arithmetic module that may determine spatial coordinate data (e.g., three-dimensional coordinate data) of body features or points on model 335 and/or accessory 330 based on image data recorded and transmitted by imaging device 325 to server subsystem 315 and processed by image recognition module 340. For example, a center of imaging device 325 may be set as a predetermined three-dimensional coordinate (e.g., an x,y,z coordinate of 0,0,0) of a three-dimensional coordinate system utilized by location module 345. For example, a center, lens, or other portion of imaging device 325 (e.g., or any other desired point in space) may be an origin (e.g., a predetermined origin) of the exemplary three-dimensional coordinate system. Any suitable type of coordinate system may be utilized by location module 345 such as, for example, a cartesian coordinate system, a spherical coordinate system, polar coordinate system, cylindrical coordinate system, and/or any other suitable type of coordinate system for determining a location (e.g., a spatial location) in three-dimensional space. Location module 345 may determine three-dimensional vector data to determine a straight-line distance and vector direction between a predetermined origin (e.g., a center of imaging device 325) or other predetermined point and one or more points or features of the image data provided and processed by imaging device 325 and/or image recognition module 340. For example, location module 345 may arithmetically determine three-dimensional coordinates of points or features of the image data provided and/or processed by imaging device 325 and image recognition module 340 as described below.

Buffer storage 350 may include components similar to the exemplary computing device and network components described below regarding FIGS. 9 and 10. For example, buffer storage 350 may include components similar to the exemplary storage medium and RAM described below regarding FIG. 9. Buffer storage 350 may be implemented in software and/or a fixed memory location in hardware. Buffer storage 350 (e.g., a data buffer) may store data temporarily during an operation of server subsystem 315. For example, the buffer storage 350 may be used to temporarily store data as it is moved between image recognition module 340 and location module 345 as described below.

The components of system 300 may be directly connected (e.g., by wire, cable, USB connection, and/or any other suitable electro-mechanical connection) to each other and/or connected via a network (e.g., via Ethernet LAN) that may be similar to the exemplary network disclosed below regarding FIG. 10. System 300 may also include communication components that may be any suitable devices for communicating data between the various components of system 300 either directly or via network communication.

For example, system 300 may include any suitable transceiver devices (e.g., transmitter device and/or receiver device) for transmitting data between components of system 300 and also for receiving data from other components of system 300. System 300 may also include a plurality of computing devices, a plurality of exemplary user interfaces, and/or a plurality of any other components of system 300 that may be in direct communication and/or connected via network. For example, components of system 300 may receive and transmit data as disclosed below regarding exemplary communication techniques of FIG. 10. For example, components of system 300 may wirelessly transmit data by any suitable technique such as, e.g., wirelessly transmitting data via 4G LTE networks (e.g., or any other suitable data transmission technique for example via network communication). Also for example, components of system 300 may transmit data via cable.

The exemplary disclosed apparatus, system, and method may be used in any suitable application for controlling an imaging device. For example, the exemplary disclosed apparatus, system, and method may be used in any suitable application for controlling a camera or other imaging device to provide a desired visual display of any suitable subject such as a human subject, an animal, an inanimate subject, and/or any desired location such as a residential, commercial, industrial, or transportation infrastructure location (e.g., airport or bridge for example for security purposes). The exemplary disclosed apparatus, system, and method may for example be used for controlling an imaging device such as a camera to display images of a human model based on input provided by a user. For example, the exemplary disclosed apparatus, system, and method may be used as a pay-to-view system for viewing erotic pictures or video of a human model.

Figure 2:
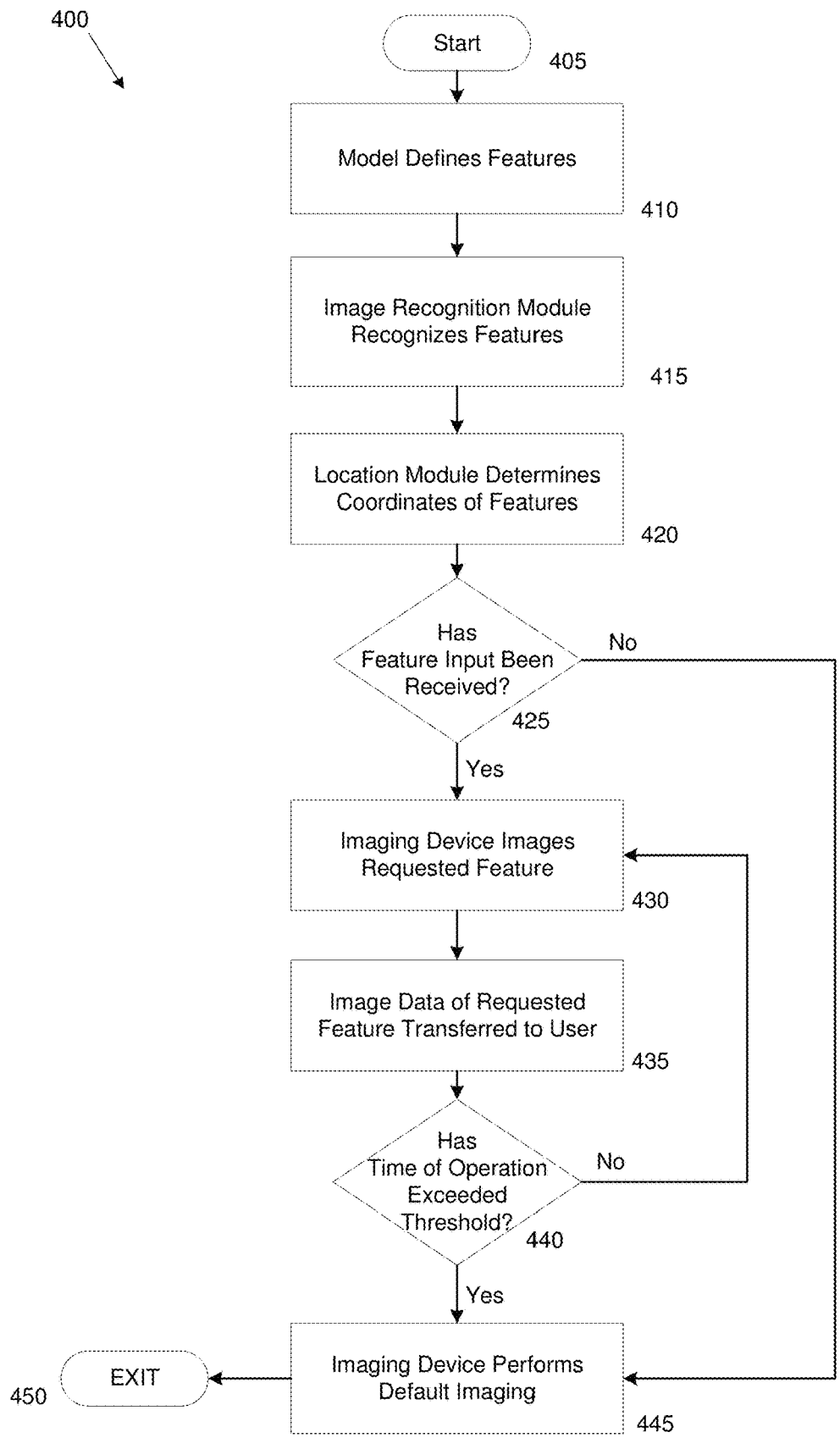
FIG. 2 is a flowchart showing an exemplary process of the present invention.

An exemplary operation of the exemplary disclosed apparatus, system, and method will now be described. For example, FIG. 2 illustrates an exemplary process 400. In at least some exemplary embodiments, process 400 may be a method for providing a broadcast platform (e.g., an online broadcast platform) based on controlling imaging device 325 that may be a camera. Process 400 begins at step 405.

At step 410, model 335 may define any desired features for use by system 300. Model 335 may define any suitable features (e.g., static points and/or body portions or features) such as a face, eyes, nose, ear, mouth, neck, breast, leg, groin, foot, and/or any other desired body portion. Model 335 may assign data or costs to each feature as described for example below. At step 415, model 335 may activate imaging device 325, which may activate image recognition module 340 to recognize and desired features (e.g., defined features and/or set features as predefined features for use later). Steps 410 and 415 may be performed simultaneously and/or iteratively, with model 335 and/or system 300 moving back and forth freely between steps 410 and 415 based on an operation of model device 320 and imaging device 325, as well as image recognition module 340.

Figure 3:
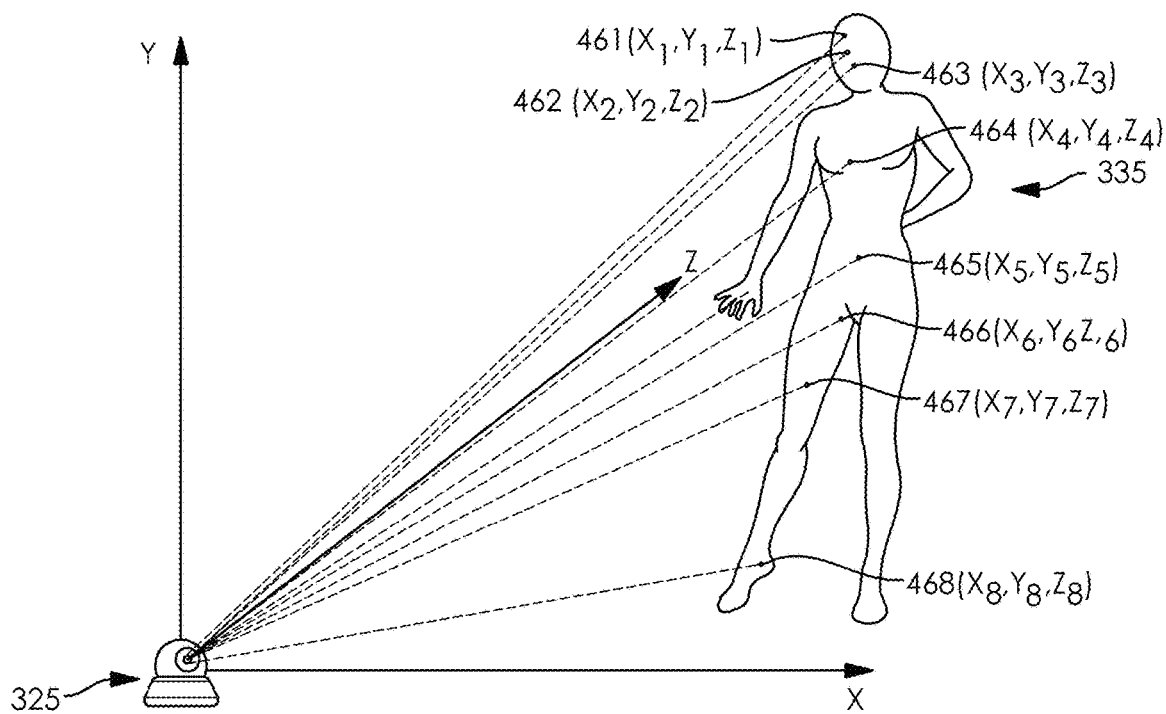
FIG. 3 is a schematic illustration of an exemplary system of the present invention.

For example at steps 410 and 415 as illustrated in FIG. 3, model 335 may use model device 320 to control imaging device 325 to define any desired features such as body portions of model 335. For example, FIG. 3 illustrates a plurality of points 461, 462, 463, 464, 465, 466, 467, and 468. For example, model 335 may be positioned within a field of view of imaging device 325 while defining features (e.g., points 461, 462, 463, 464, 465, 466, 467, and 468). Model 335 may utilize model device 320 to define the exemplary features. For example, model device 320 may display a real time video image of model 335 on a display, and may receive input (e.g., via tapping on a touchscreen of model device 325 and/or any other suitable technique for entering input such as keystrokes or pulldowns) to identify desired points (e.g., points 461, 462, 463, 464, 465, 466, 467, and 468) identified by model 335. For example, model 335 may enter the input using real-time video imaging of himself or herself imaged by imaging device 325 and displayed on model device 320, or by using a picture taken by imaging device 325 and displayed on model device 320. The defined features (e.g., identified points such as points 461, 462, 463, 464, 465, 466, 467, and 468) may be predetermined features that may be utilized by system 300 as described for example herein. The identified points (e.g., points 461, 462, 463, 464, 465, 466, 467, and 468) identified on the image data provided by imaging device 325 may be transferred via model device 320 to server subsystem 315 for use by system 300 as described for example herein. For example, system 300 (e.g., server subsystem 315) may store the predetermined features for use during an operation of process 400. For example, points 461, 462, 463, 464, 465, 466, 467, and 468 may represent recognized images of body portions (e.g., image-recognized body portions) of model 335. During an operation of system 300 as described for example below, location module 345 may determine coordinates for points 461, 462, 463, 464, 465, 466, 467, and 468.

Also at steps 410 and 415, model 335 may assign any desired information or data to each predetermined feature (e.g., to points 461, 462, 463, 464, 465, 466, 467, and 468). For example, model 335 may input any desired information (e.g., based on input prompts provided by an interface of model device 320) to system 300 via model device 320. For example, model 335 may provide information describing a predetermined feature (e.g., a body portion associated with a point such as points 461, 462, 463, 464, 465, 466, 467, and 468) such as a viewing price or cost or viewing duration. For example, model 335 may set a cost or price to be paid by a user (e.g., user 324) for viewing each predetermined feature and/or a time period during which user 324 may watch the exemplary image data. In at least some exemplary embodiments, user 324 may pay a "tip" via system 300 that may be a monetary tip (e.g., currency, cryptocurrency, a prepaid credit, and/or any other suitable item of value) corresponding to the cost or price set by model 335. Model 335 may thereby determine the price to be paid by users such as user 324 to view predetermined features (e.g., points 461, 462, 463, 464, 465, 466, 467, and 468) that may be body portions of model 335.

Figure 4:
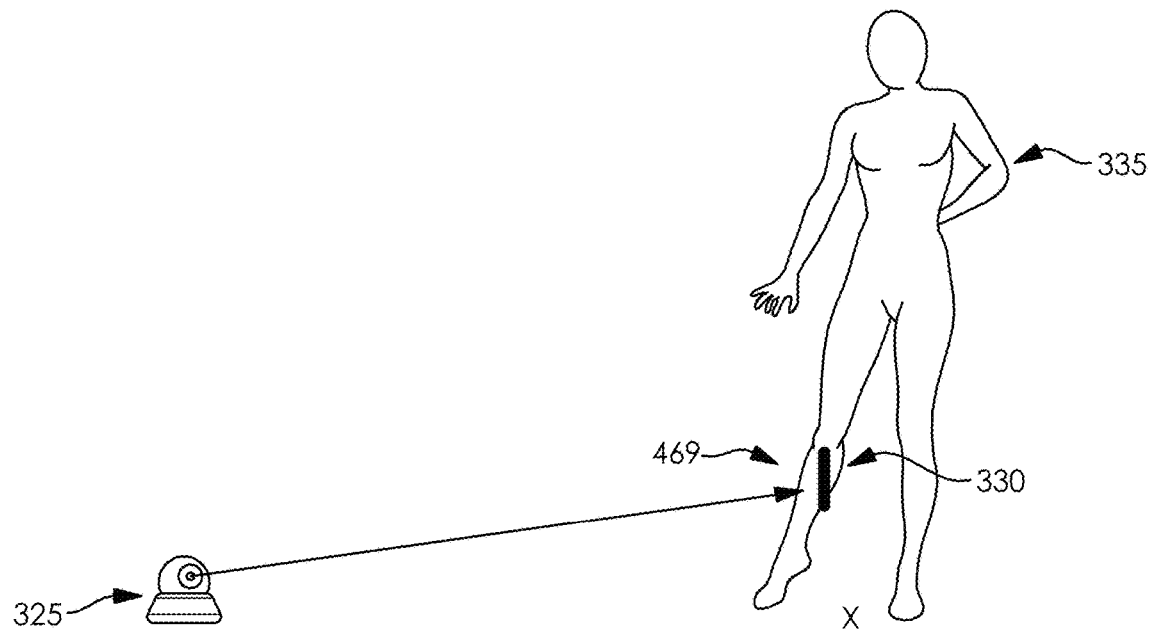
FIG. 4 is a schematic illustration of an exemplary system of the present invention.
Figure 5:
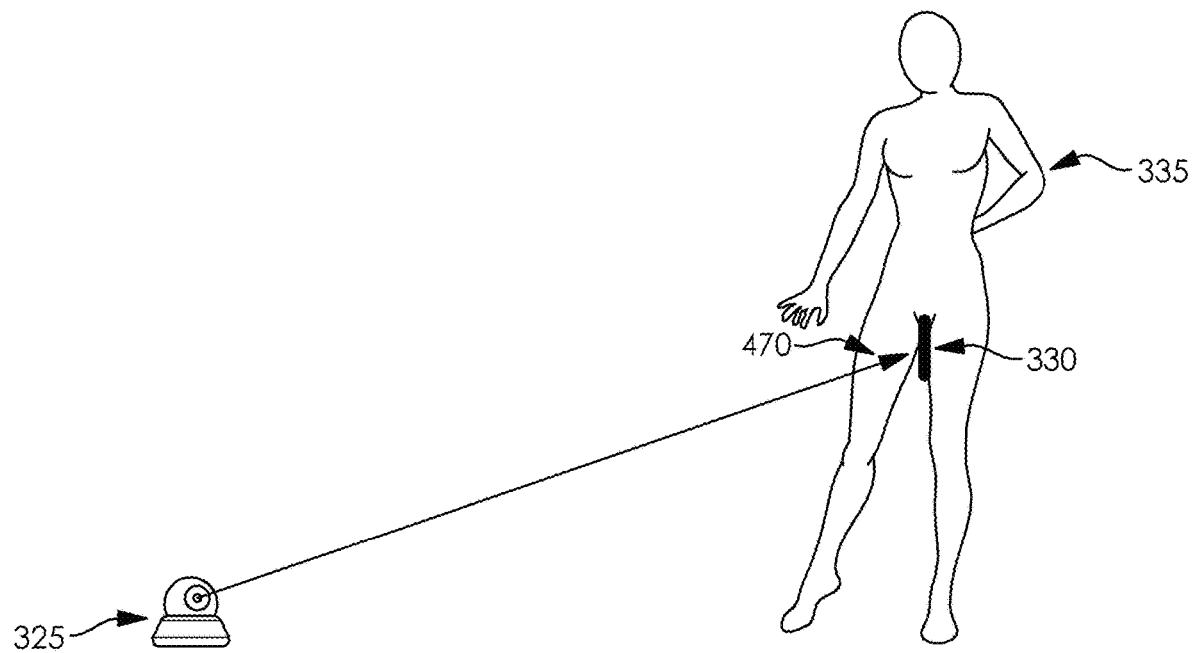
FIG. 5 is a schematic illustration of an exemplary system of the present invention.
Figure 6:
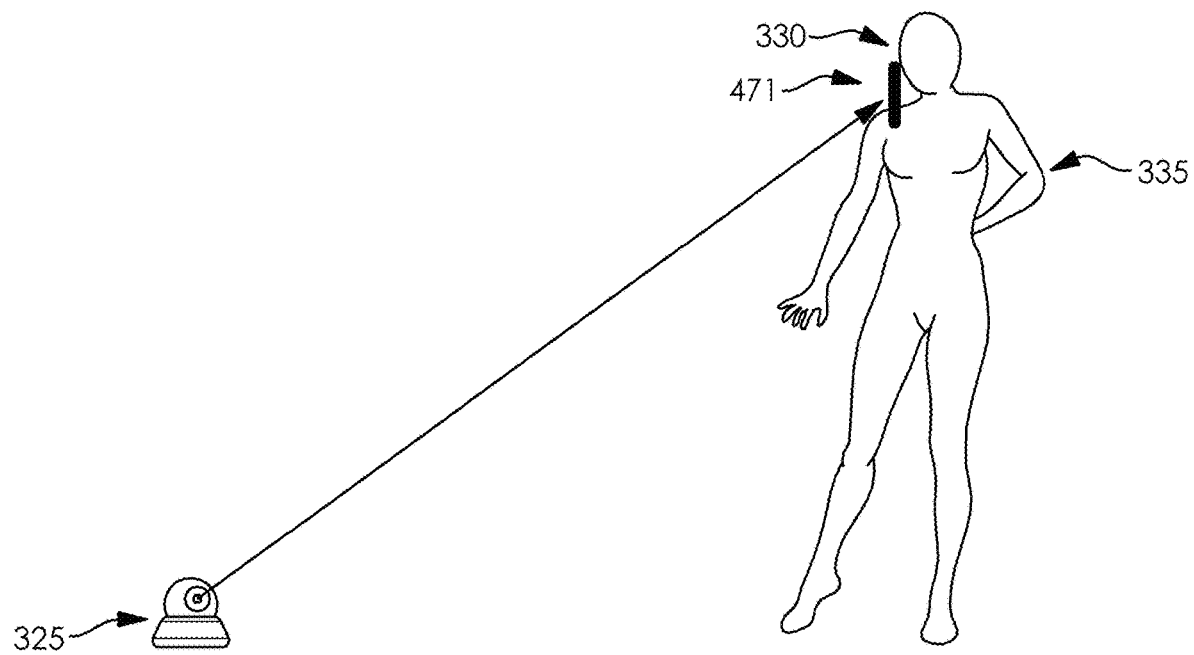
FIG. 6 is a schematic illustration of an exemplary system of the present invention.

Also at steps 410 and 415, model 335 may define accessory 330 as illustrated for example in FIGS. 4-6 similar to as described above regarding the exemplary predetermined features (e.g., points 461, 462, 463, 464, 465, 466, 467, and 468). For example, accessory 330 itself may be recognized as a predetermined feature similar to image recognition of the exemplary predetermined features (e.g., points 461, 462, 463, 464, 465, 466, 467, and 468) described above. Also, model 335 may define features of accessory 330 corresponding to locations on model 335 on which or against which accessory 330 may be placed. For example, model 335 may provide data or input to system 300 corresponding to any desired position of accessory 330 on model 335. For example, image recognition module 340 may recognize as predetermined features a location of accessory 330 on or against certain locations of model 335. The predetermined locations may correspond to accessory 330 being placed on or against any predetermined feature (e.g., points 461, 462, 463, 464, 465, 466, 467, and 468) and/or any other desired location on or near model 335. Similar to as described above regarding the exemplary predetermined features (e.g., points 461, 462, 463, 464, 465, 466, 467, and 468), model 335 may provide a cost or price to be paid by a user (e.g., user 324) to view accessory 330 being placed on or against a predetermined feature (e.g., on a predetermined location of model 335 as described above). FIGS. 4-6 illustrate exemplary predetermined features (e.g., points 469, 470, and 471) associated with a placement of accessory 330.

System 300 may store images associated with any of the above-described exemplary predetermined features, such as pictures or videos. For example, low-resolution "thumbnail" images or videos as well as high-resolution images or videos may be stored based on the above-described exemplary feature definition and image recognition processes at step 410.

At step 420, location module 345 may determine spatial coordinates (e.g., three-dimensional coordinates) of one or more predetermined features identified in steps 410 and 415. In at least some exemplary embodiments, location module 345 may be a location arithmetic module that may calculate three-dimensional coordinate data (e.g., a coordinate x,y,z as defined by a cartesian coordinate system utilizing three axes). As illustrated for example in FIG. 3 showing model 335 (e.g., or in FIGS. 4-6 for accessory 330), location module 345 may utilize any suitable technique for determining coordinate data based on image data and image recognition data provided by imaging device 325 and image recognition module 340. For example, location module 345 may determine three-dimensional vector data to determine a straight-line distance and direction between a predetermined origin (e.g., a center of imaging device 325 that may be defined as coordinate 0,0,0 or any other desired point) and one or more points or features of the image data provided and processed by imaging device 325 and/or image recognition module 340. For example, location module 345 may arithmetically determine three-dimensional coordinates of points or features of the image data provided and/or processed by imaging device 325 and image recognition module 340. For example, for points 461, 462, 463, 464, 465, 466, 467, and 468, location module 345 may use image and image recognition data provided by imaging device 325 and image recognition module 340 to determine respective coordinate data x1,y1,z1 for point 461, x2,y2,z2 for point 462, x3,y3,z3 for point 463, x4,y4,z4 for point 464, x5,y5,z5 for point 465, x6,y6,z6 for point 466, x7,y7,z7 for point 467, and/or x8,y8,z8 for point 468 (and/or any other desired points or portions corresponding to a desired feature of model 335, accessory 330, or other object imaged by imaging device 325). For example based on image and image recognition data provided by imaging device 325 and image recognition module 340, location module 345 may determine three-dimensional coordinates based on estimating distance based on: an image size of model 335 (e.g., thereby calculating distance from imaging device 325), stereoscopic or other three-dimensional image data provided directly from imaging data of imaging device 325, predetermined criteria (e.g., a certain distance between imaging device 325 and model 335 being assumed based on operating instructions of system 300, for example indicating that model 335 is to be positioned a certain distance from imaging device 325), input provided by model 335 (e.g., model 335 may input a distance between imaging device 325 and model 335 during operation), and/or based any other suitable technique.

Location module 345 may thereby provide three-dimensional coordinate data to system 300 for predetermined features identified above (e.g., points 461, 462, 463, 464, 465, 466, 467, and 468). Location module 345 may provide three-dimensional coordinate data in real-time or near real-time. Location module 345 may update three-dimensional coordinate data at any desired time interval such as, for example, a few times or many times (e.g., 10 times or more) per second. For example as model 335 moves while being imaged by imaging device 325, location module 345 may operate to use image and image recognition data provided by imaging device 325 and image recognition module 340 to continuously update three-dimensional coordinate data of the exemplary features identified above (e.g., points 461, 462, 463, 464, 465, 466, 467, and 468). Location module 345 may thereby provide up-to-date, continuously updated three-dimensional coordinate data of the exemplary features (e.g., portions of model 335 as described for example above) to system 300, thereby providing updated location data of model 335, accessory 330, and any other desired objects or points in real-time or near-real-time. Some or all location data may be stored so that constantly updated location data may be provided to system 300 corresponding to, for example, running video footage or still pictures of the imaging data that was taken of model 335, accessory 330, and/or any other desired object or target imaged by imaging device 325.

Steps 410, 415, and 420 may be performed simultaneously and/or iteratively, with model 335 and/or system 300 moving back and forth freely between steps 410, 415, and 420 based on an operation of model device 320 and imaging device 325, as well as image recognition module 340, location module 345, and buffer storage 350.

At step 425, system 300 may determine whether or not feature input has been received. For example, system 300 may determine whether or not user 324 has entered input to system 300 via user device 322 to request viewing (e.g., special viewing) of an exemplary feature (e.g., points 461, 462, 463, 464, 465, 466, 467, and 468), a desired position of accessory 330 on model 335 (e.g., as illustrated in FIGS. 4-6), a desired action to be taken by model 335 (e.g., an erotic action such as masturbation or other bodily function), or any other inputted request made by user 324. For example at step 425, user 324 may enter input to system 300 to provide a "tip action" on imaging device 325. For example, user 324 may provide a "tip" (e.g., a monetary tip) that may be equal to the cost or price set by model 335 at steps 410 and/or 415 for user 324 to view an exemplary feature (e.g., points 461, 462, 463, 464, 465, 466, 467, and 468) at increased resolution (e.g., zoomed and/or unblurred), to view a certain action with accessory 330 (e.g., as illustrated in FIGS. 4-6), and/or to have model 335 take any predetermined action (e.g., having a predetermined cost or price set by model 335 at steps 410 and/or 415 above). For example, user 324 may enter payment to system 300 (e.g., via user device 322 using for example a credit card or cryptocurrency) to request a special picture or video of model 335 or for model 335 to take a desired action. System 300 may also deem a feature has been requested based on a predetermined operation of system 300 (e.g., system 300 may follow a predetermined sequence for providing "tip actions" to show special pictures, videos, or actions to user 324).

If feature input is not received, system 300 may proceed to step 445 as described further below. If feature input is received (e.g., user 324 makes a "tip action"), system 300 may proceed to step 430. At step 430, system 300 controls imaging device 325 to image and provide a requested feature. For example as described further below regarding the exemplary process of FIG. 8, imaging device 325 may take special pictures or video of a body portion of model 335 (e.g., points 461, 462, 463, 464, 465, 466, 467, and/or 468, features as shown in FIGS. 4-6, and/or any other desired feature or action) based on payment provided by user 324 (e.g., "tip action") at step 425. For example based on the operation described further below regarding FIG. 8, imaging device 325 may be turned and/or zoomed via one or more actuators 327 being controlled by system 300 to provide special video or pictures (e.g., zoomed, unblurred, and/or any other desired characteristics). For example if user 324 requested zoomed-in video or a picture of point 461 (e.g., or any other point), system 300 may control imaging device 325 to turn to and/or zoom in at point 461 (e.g., or any other point). Imaging device 325 may then for example take image data in a second mode at a higher resolution at step 430 as compared to a first mode of imaging at other steps of process 400 that may be a relatively lower resolution. System 300 may then proceed to step 435.

At step 435, system 300 may transfer image data of the requested feature (e.g., and/or other data associated with the requested feature) to user 324. In at least some exemplary embodiments, system 300 may send special videos or pictures to user 324 in response to the feature input (e.g., "tip action") user 324 made at step 425. For example if user 324 requested zoomed-in video or a picture of point 461 (e.g., or any other point), system 300 may transfer a zoomed-in (e.g., high resolution) video or picture of point 461 (e.g., face portion of model 335) or any other exemplary feature if requested at step 425 (e.g., points 461, 462, 463, 464, 465, 466, 467, and/or 468, features as shown in FIGS. 4-6, and/or any other desired feature or action). For example based on an operation of system 300, special video or pictures based on the request at step 425 may be displayed on user device 322.

At step 440, system 300 may determine whether or not a time of operation (e.g., at step 435) has exceeded a threshold. The exemplary threshold may be predetermined and/or set by system 300 or set by model 335 at steps 410 and/or 415. For example, the exemplary threshold may be set by model 335 and/or system 300 according to the cost or value (e.g., to be paid by user 324), with longer time thresholds corresponding for example to higher costs to be paid by user 324. For example, model 335 may set a threshold to be between about 5 and about 30 seconds (e.g., about 10 seconds), one minute, a few minutes, 5 minutes, or more (e.g., or an unlimited period). If the time of operation, which may be the amount of time user 324 has viewed the data at step 435, has not exceeded the exemplary threshold, the system may return to step 430. System 300 may continue to return to steps 430 and 435 until the time of operation (amount of time user 324 has viewed data at step 435 that was transferred at step 430) exceeds the threshold. For example, system 300 may provide real-time, near real-time, or pre-recorded video and/or pictures to user 324 at step 435. In at least some exemplary embodiments, user device 322 may include a camera that may record images of user 324 that are transferred to model 335 via model device 320 so that user 324 may interact in real-time with model 335. When the time of operation of steps 430 and 435 exceeds the exemplary threshold, system 300 may proceed to step 445.

At step 445, system 300 may control imaging device 325 and server subsystem 315 to perform default imaging and to transfer default images to user 324 via user device 322. In at least some exemplary embodiments, system 300 may control imaging device 320 to record (e.g., take) general pictures or videos using a default setting of imaging device 325. For example, the exemplary default or general video or picture may be a relatively low-resolution picture or video of model 335, a partially or completely blurry picture or video of model 335, a generic image or stock photo, or any other suitable image data that may be displayed when an exemplary time of operation has exceeded an exemplary threshold as described above. The exemplary default or general video or picture may be a still picture, real-time video, near-real-time video, or a pre-recorded video of model 335 and/or any other desired object. Process 400 ends at step 450.

Figure 8:
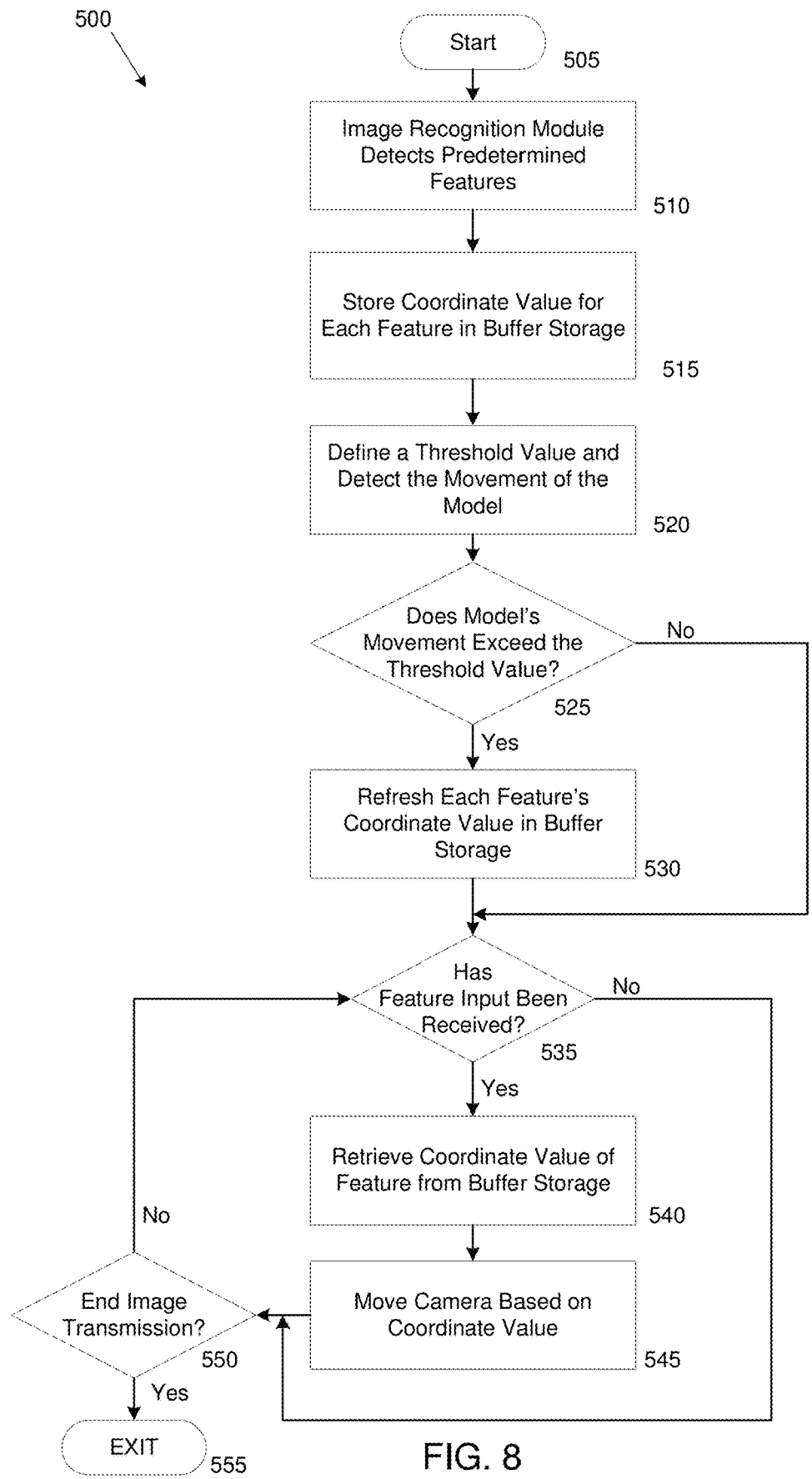
FIG. 8 is a flowchart showing an exemplary process of the present invention.

Another exemplary operation of the exemplary disclosed apparatus, system, and method will now be described. For example, FIG. 8 illustrates an exemplary process 500. In at least some exemplary embodiments, process 500 may be a method for adjusting a direction of imaging device 325 using server subsystem 315 (e.g., including buffer storage 350). As described for example herein, buffer storage 350 may store (e.g., temporarily store) data of image recognition module 340 and/or location module 345. Process 500 begins at step 505.

At step 510, image recognition module 340 may detect predetermined features (e.g., identified features such as points 461, 462, 463, 464, 465, 466, 467, and/or 468, features as shown in FIGS. 4-6, and/or any other desired feature or action) as described for example above. At step 515, system 300 may store coordinate values (e.g., coordinate values that were determined as described for example above) for each predetermined or identified feature in buffer storage 350.

At step 520, system 300 may define a threshold value and detect a movement of model 335. The exemplary threshold value may be determined based on predetermined criteria, input of model 335 and/or user 324, as a function of a movement of model 335 (e.g., whenever image recognition module 340 detects a movement of model 335), and/or any other suitable technique. System 300 may detect a movement of model 335 based on an operation of imaging device 325 and server subsystem 315 as described for example above. The exemplary threshold may be any suitable amount such as one or more centimeters (e.g., or a fraction of an inch), several inches, or any other suitable amount or distance.

At step 525, system 300 may determine whether or not a movement of model 335 (e.g., one or more body parts of model 335 and/or accessory 330) exceeds the exemplary threshold determined at step 520. For example based on continuously-updated three-dimensional coordinate data of the exemplary features (e.g., identified features such as points 461, 462, 463, 464, 465, 466, 467, and/or 468, features as shown in FIGS. 4-6, and/or any other desired feature or action), system 300 may determine at step 525 whether one or more exemplary features has undergone an amount of displacement or movement that exceeds the exemplary threshold defined at step 520. The exemplary threshold may be constant or may vary for each exemplary feature (e.g., the threshold for movement of point 461 may be the same or different than the exemplary threshold for point 465). If movement of one or more features exceeds the exemplary threshold, system 300 proceeds to step 530. At step 530, system 300 may refresh the coordinate value for each exemplary feature (e.g., identified features such as points 461, 462, 463, 464, 465, 466, 467, and/or 468, features as shown in FIGS. 4-6, and/or any other desired feature or action) in buffer storage 350 based on recalculation by location module 345. Also for example, coordinate values may be refreshed for features having movement that exceed the threshold value, but not for features that do not exceed the threshold value based on recalculation by location module 345. System 300 may then proceed to step 535. If no feature movement exceeds a threshold value at step 525, system may skip step 530 and proceed directly to step 535.

At step 535, system 300 may determine whether or not a feature input (e.g., a request by user 324 to see a certain exemplary feature) has been received, similar to step 425 described above. If feature input has been received, system 300 proceeds to step 540. At step 540, system 300 may retrieve (e.g., call out) the coordinate value (e.g., three-dimensional coordinate value) of the exemplary feature corresponding to the requested feature of the feature input. For example, if the user requested a zoomed-in video of point 461, the three-dimensional coordinate of point 461 stored by buffer storage 350 at step 515 or refreshed at step 530 may be retrieved by system 300 from buffer storage 350. System 300 then proceeds to step 545.

Figure 7:
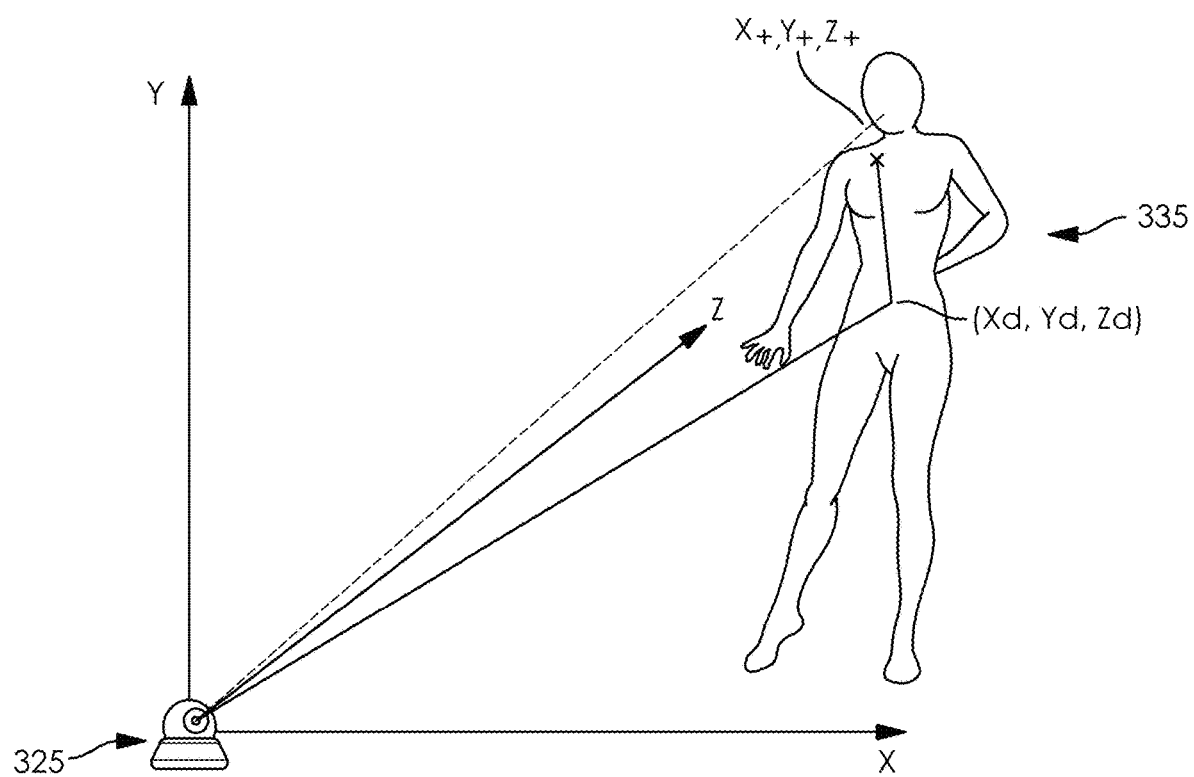
FIG. 7 is a schematic illustration of an exemplary system of the present invention.

At step 545, system 300 may move imaging device 325 based on the three-dimensional coordinate value retrieved at step 540. System 300 may control actuators 327 to turn and/or zoom imaging device 325 to point at and/or zoom in at the feature (e.g., point 461 or any other desired feature) based on the retrieved three-dimensional coordinate. For example, location module 345 may determine a vector pointing from imaging device 325 to the retrieved three-dimensional coordinate (e.g., point 461 or any other desired feature). For example, location module 345 may arithmetically construct a vector that describes a direction of viewing from an origin coordinate of imaging device 325 (e.g., or any other desired point) and the retrieved three-dimensional coordinate. For example as illustrated in FIG. 7, location module 345 may arithmetically calculate an adjustment route of imaging device 325 from its default or current orientation and position to an orientation and position pointing at the identified feature associated with the retrieved three-dimensional coordinate (e.g., point 461). For example as illustrated in FIG. 7, (Xd,Yd,Zd) may be a default setting coordinate (e.g., how imaging device 325 may be positioned when for example at step 445 of process 400). (Xt,Yt,Zt) may be the retrieved three-dimensional coordinate associated with the desired exemplary feature (e.g., as requested by user 324 by providing feature input or "tip action"). Server subsystem 315 may control imaging device 325 (e.g., via controlling an operation of actuators 327) to rotate and move one or more lens (e.g., zoom in) at (Xt,Yt,Zt) and maintain this position for a desired time (e.g., corresponding to the threshold of step 440 of process 400, which may be any desired time such as 10 seconds or any other duration as described herein). At step 545, imaging device 325 may record images in a second mode with an image resolution that may be higher than when imaging device is operating in a first mode (e.g., at other steps of process 500). System 300 may then proceed to step 550. If feature input was not received at step 535, system 300 may proceed directly to step 550.

At step 550, system 300 may determine whether or not an image transmission or broadcast should be ended (e.g., whether a time of operation has exceeded a threshold as described above regarding step 440 of process 400). If system 300 determines that the image transmission should continue, system 300 returns to step 535. If system 300 determines that the image transmission should not continue, process 500 ends at step 555.

In at least some exemplary embodiments, the exemplary disclosed method may include imaging a target object (e.g., model 335 and/or accessory 330) in a first imaging mode (e.g., a default mode for example at step 445) using an imaging device (e.g., imaging device 325), identifying a feature (e.g., points 461, 462, 463, 464, 465, 466, 467, and/or 468, features as shown in FIGS. 4-6, and/or any other desired feature or action) of the target object, using image recognition to recognize the feature, determining a spatial coordinate data of the feature, updating the spatial coordinate data of the feature after the target object moves, transferring a feature input data (e.g., at step 425), the feature input data requesting additional imaging of the feature, and actuating the imaging device based on the spatial coordinate data to additionally image the feature in a second imaging mode (e.g., at step 430 and/or step 545) using the imaging device. The exemplary method may further include assigning a cost and a time threshold to the feature. Transferring the feature input data may include receiving payment from a user (e.g., user 324) that is equal to or greater than the cost. The exemplary disclosed method may further include transferring image data of the additional imaging of the feature in the second imaging mode to a user. Transferring image data may be stopped when a duration of transferring image data exceeds the time threshold. The target object may be a human model and the human model sets the cost and the time threshold. The additional imaging of the feature in the second imaging mode may include recording second images of the feature that may have a higher image resolution than first images of the feature recorded in the first imaging mode. Actuating the imaging device may include zooming the imaging device and turning the imaging device, the imaging device being a digital video camera. The target object may be a human model and the feature may be a body portion of the human model. Actuating the imaging device may include storing the spatial coordinate data in a buffer storage and updating the spatial coordinate data after the target object moves.

In at least some exemplary embodiments, the exemplary disclosed system may include an image recognition module (e.g., image recognition module 340), comprising computer-executable code stored in non-volatile memory, a location module (e.g., location module 345), comprising computer-executable code stored in non-volatile memory, a buffer storage (e.g., buffer storage 350), a processor, and an imaging device (e.g., imaging device 325). The image recognition module, the location module, the buffer storage, the processor, and the imaging device may be configured to image a target object (e.g., model 335 and/or accessory 330) in a first imaging mode (e.g., a default mode for example at step 445) using an imaging device (e.g., imaging device 325), identify a plurality of features (e.g., points 461, 462, 463, 464, 465, 466, 467, and/or 468, features as shown in FIGS. 4-6, and/or any other desired feature or action) of the target object, recognize the plurality of features using the image recognition module, determine a spatial coordinate data for each of the plurality of features using the location module, update the spatial coordinate data of the plurality of features after the target object moves, transfer a feature input data (e.g., at step 425), the feature input data requesting additional imaging of one of the plurality of features, and actuate the imaging device based on the spatial coordinate data of the one of the plurality of features to additionally image the one of the plurality of features in a second imaging mode (e.g., at step 430 and/or step 545) using the imaging device. The spatial coordinate data of the plurality of features may be stored in the buffer storage. The system may further include an accessory and a user interface, the accessory and the imaging device communicating with the user interface. The target object may be a human model, and the accessory may be held by the human model. The system may further include transferring image data of the additional imaging of the one of the plurality of features in the second imaging mode to a user. The system may further include updating the spatial coordinate data of the plurality of features stored in the buffer storage when a movement of at least one of the plurality of features of the target object exceeds a threshold distance. The additional imaging of the one of the plurality of features in the second imaging mode may include recording second images of the one of the plurality of features that have a higher image resolution than first images of the one of the plurality of features recorded in the first imaging mode.

In at least some exemplary embodiments, the exemplary disclosed method may include imaging a target object (e.g., model 335 and/or accessory 330) in a first imaging mode (e.g., a default mode for example at step 445) using an imaging device (e.g., imaging device 325), identifying a plurality of features (e.g., points 461, 462, 463, 464, 465, 466, 467, and/or 468, features as shown in FIGS. 4-6, and/or any other desired feature or action) of the target object, using image recognition to recognize the plurality of features, determining a three-dimensional coordinate data for each of the plurality of features, updating the three-dimensional coordinate data of each of the plurality of features after the target object moves, transferring a feature input data (e.g., at step 425), the feature input data requesting additional imaging of one of the plurality of features, and actuating the imaging device based on the spatial coordinate data of the one of the plurality of features to additionally image the one of the plurality of features in a second imaging mode (e.g., at step 430 and/or step 545) using the imaging device. The additional imaging of the one of the plurality of features in the second imaging mode may include recording second images of the one of the plurality of features that have a higher image resolution than first images of the one of the plurality of features recorded in the first imaging mode. The three-dimensional coordinate data of the plurality of features may be stored in a buffer storage. The exemplary method may further include updating the three-dimensional coordinate data of the plurality of features stored in the buffer storage when a movement of at least one of the plurality of features of the target object exceeds a threshold distance. The target object may be a human model.

The exemplary disclosed apparatus, system, and method may provide an efficient and easy-to-implement technique for controlling an imaging device to provide a visual display. The exemplary disclosed apparatus, system, and method may provide an efficient technique for displaying pictures and videos of a desired resolution and scope to a user. For example, the exemplary disclosed apparatus, system, and method may efficiently display pictures and video of a desired subject (e.g., a human model) to a user based on a predetermined amount of payment being provided by the user.

In at least some exemplary embodiments, the exemplary disclosed apparatus, system, and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 9:
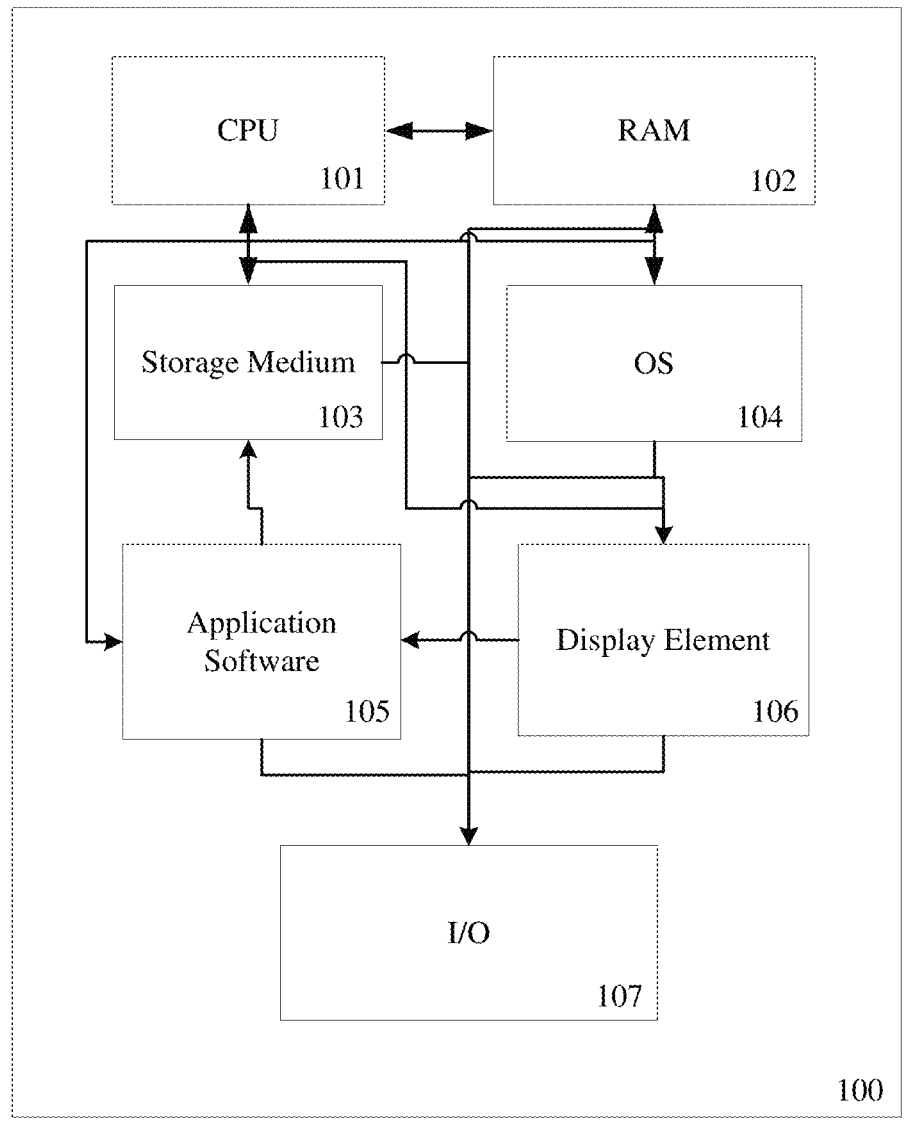
FIG. 9 is a schematic illustration of an exemplary computing device, in accordance with at least some exemplary embodiments of the present disclosure.

An illustrative representation of a computing device appropriate for use with embodiments of the system of the present disclosure is shown in FIG. 9. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 10, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 10:
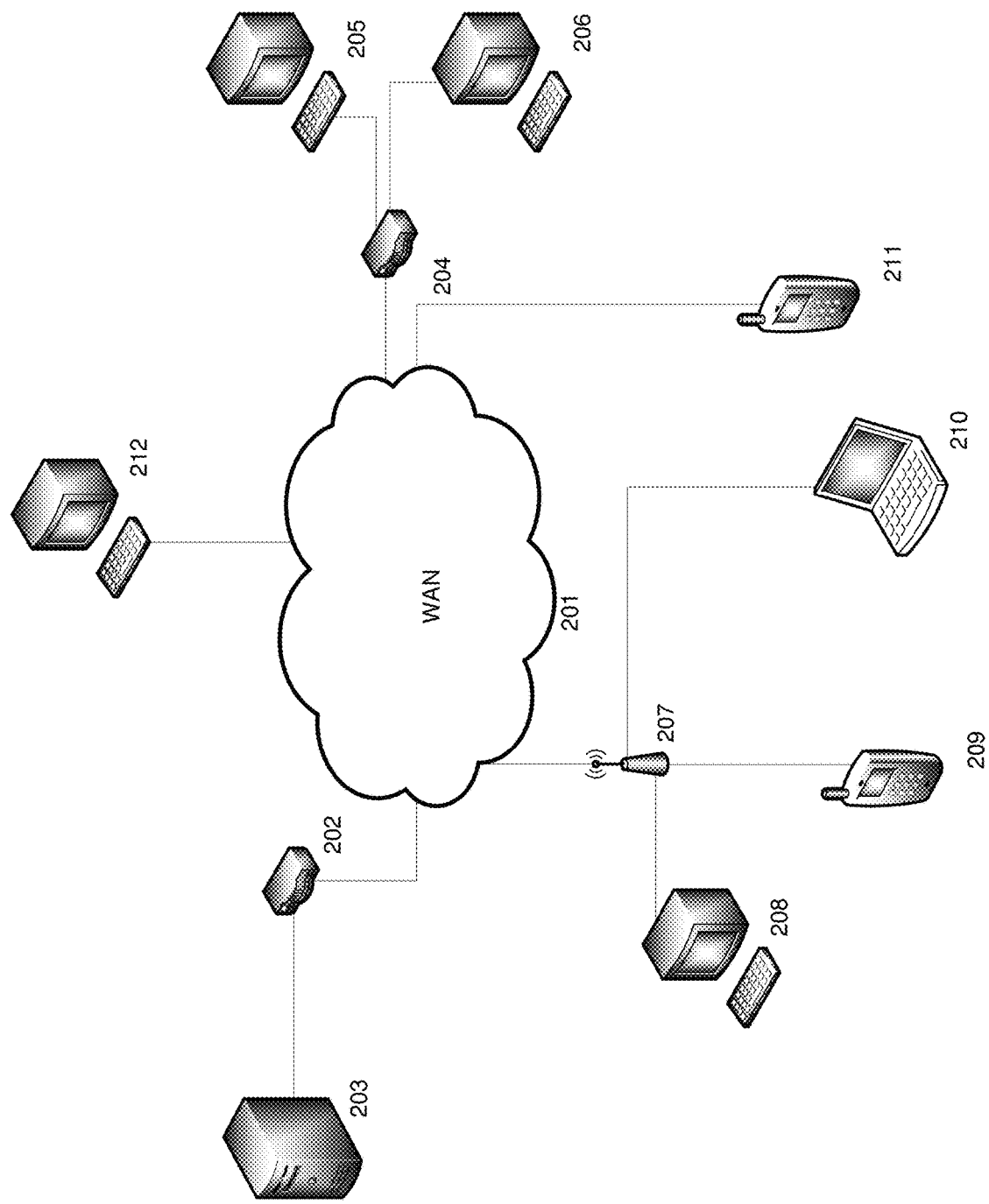
FIG. 10 is a schematic illustration of an exemplary network, in accordance with at least some exemplary embodiments of the present disclosure.

Referring to FIG. 10, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 10, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
    imaging a target object in a first imaging mode using an imaging device;
    identifying a feature of the target object;
    using image recognition to recognize the feature;
    determining a spatial coordinate data of the feature;
    updating the spatial coordinate data of the feature after the target object moves;
    transferring a feature input data, the feature input data requesting additional imaging of the feature; and
    actuating the imaging device based on the spatial coordinate data to additionally image the feature in a second imaging mode using the imaging device.

2. The method of claim 1, further comprising assigning a cost and a time threshold to the feature.

3. The method of claim 2, wherein transferring the feature input data includes receiving payment from a user that is equal to or greater than the cost.

4. The method of claim 2, further comprising transferring image data of the additional imaging of the feature in the second imaging mode to a user.

5. The method of claim 4, wherein transferring image data is stopped when a duration of transferring image data exceeds the time threshold.

6. The method of claim 2, wherein the target object is a human model and the human model sets the cost and the time threshold.

7. The method of claim 1, wherein the additional imaging of the feature in the second imaging mode includes recording second images of the feature that have a higher image resolution than first images of the feature recorded in the first imaging mode.

8. The method of claim 1, wherein actuating the imaging device includes zooming the imaging device and turning the imaging device, the imaging device being a digital video camera.

9. The method of claim 1, wherein the target object is a human model and the feature is a body portion of the human model.

10. The method of claim 1, wherein actuating the imaging device includes storing the spatial coordinate data in a buffer storage and updating the spatial coordinate data after the target object moves.

11. A system, comprising:
    an image recognition module, comprising computer-executable code stored in non-volatile memory;
    a location module, comprising computer-executable code stored in non-volatile memory;
    a buffer storage;
    a processor; and
    an imaging device;
    wherein the image recognition module, the location module, the buffer storage, the processor, and the imaging device are configured to:
        image a target object in a first imaging mode using an imaging device;
        identify a plurality of features of the target object;
        recognize the plurality of features using the image recognition module;
        determine a spatial coordinate data for each of the plurality of features using the location module;
        update the spatial coordinate data of the plurality of features after the target object moves;
        transfer a feature input data, the feature input data requesting additional imaging of one of the plurality of features; and
        actuate the imaging device based on the spatial coordinate data of the one of the plurality of features to additionally image the one of the plurality of features in a second imaging mode using the imaging device;
        wherein the spatial coordinate data of the plurality of features is stored in the buffer storage.

12. The system of claim 11, further comprising an accessory and a user interface, the accessory and the imaging device communicating with the user interface.

13. The system of claim 12, wherein the target object is a human model, and the accessory is held by the human model.

14. The system of claim 11, further comprising transferring image data of the additional imaging of the one of the plurality of features in the second imaging mode to a user.

15. The system of claim 11, further comprising updating the spatial coordinate data of the plurality of features stored in the buffer storage when a movement of at least one of the plurality of features of the target object exceeds a threshold distance.

16. The system of claim 11, wherein the additional imaging of the one of the plurality of features in the second imaging mode includes recording second images of the one of the plurality of features that have a higher image resolution than first images of the one of the plurality of features recorded in the first imaging mode.

17. A method, comprising:
    imaging a target object in a first imaging mode using an imaging device;
    identifying a plurality of features of the target object;
    using image recognition to recognize the plurality of features;
    determining a three-dimensional coordinate data for each of the plurality of features;
    updating the three-dimensional coordinate data of each of the plurality of features after the target object moves;
    transferring a feature input data, the feature input data requesting additional imaging of one of the plurality of features; and
    actuating the imaging device based on the spatial coordinate data of the one of the plurality of features to additionally image the one of the plurality of features in a second imaging mode using the imaging device;
    wherein the additional imaging of the one of the plurality of features in the second imaging mode includes recording second images of the one of the plurality of features that have a higher image resolution than first images of the one of the plurality of features recorded in the first imaging mode.

18. The method of claim 17, wherein the three-dimensional coordinate data of the plurality of features is stored in a buffer storage.

19. The method of claim 18, further comprising updating the three-dimensional coordinate data of the plurality of features stored in the buffer storage when a movement of at least one of the plurality of features of the target object exceeds a threshold distance.

20. The method of claim 17, wherein the target object is a human model.

\* \* \* \* \*